United States Patent [19]

Schuster

[11] 4,254,809
[45] Mar. 10, 1981

[54] TWO-PIECE RIVET

[75] Inventor: Michael M. Schuster, Santa Monica, Calif.

[73] Assignee: Hi Shear Corporation, Torrance, Calif.

[21] Appl. No.: 941,257

[22] Filed: Sep. 11, 1978

[51] Int. Cl.³ .................. F16B 39/02; F16B 35/00
[52] U.S. Cl. .................. 411/167; 411/260; 411/277; 411/285; 411/308; 411/500
[58] Field of Search .......... 85/1 R, 7, 5 R, 1 T, 85/37; 151/2 A, 2 R, 21 C, 21 B

[56] References Cited

U.S. PATENT DOCUMENTS

| | | | |
|---|---|---|---|
| 1,926,925 | 9/1933 | Wescott | 85/1 T X |
| 2,059,853 | 11/1936 | Daiber | 85/32 T |
| 2,396,661 | 3/1946 | Keller et al. | 85/37 |
| 2,955,505 | 10/1960 | Schuster | 85/5 R |
| 3,290,982 | 12/1966 | Marschner | 85/7 X |
| 3,560,124 | 2/1971 | Bergere | 85/7 |
| 3,587,701 | 6/1971 | Gold et al. | 151/21 B |
| 3,915,053 | 10/1975 | Ruhl | 85/7 |
| 4,054,045 | 10/1977 | King | 85/7 X |

FOREIGN PATENT DOCUMENTS 2422095 11/1975 Fed. Rep. of Germany ........ 151/21 C
226987 8/1943 Switzerland ............................... 85/1 T

*Primary Examiner*—Ramon S. Britts
*Attorney, Agent, or Firm*—Donald D. Mon

[57] ABSTRACT

A two-piece rivet assembly comprising a shank member and a collar. The shank member includes a head, a cylindrical shank, and a helical thread with a substantially constant pitch, but with a crest diameter which decreases as it extends away from a maximum adjacent to its end farthest from the shank. The ring-like collar has an inner wall, an outer wall, and a first and a second end. The inner wall defines a passage between the ends to receive at least a portion of the thread. With the shank placed in an aperture in a workpiece with at least a portion of the thread projecting beyond a surface of the workpiece, the collar is placed over the thread and a swaging setting force is applied. This force applies both axial and radial components to the collar. This forces the collar against a surface of the workpiece and swages the wall into the thread at its maximum diameter and then continuously along the thread, exerting a tensile force on the shank member.

14 Claims, 18 Drawing Figures

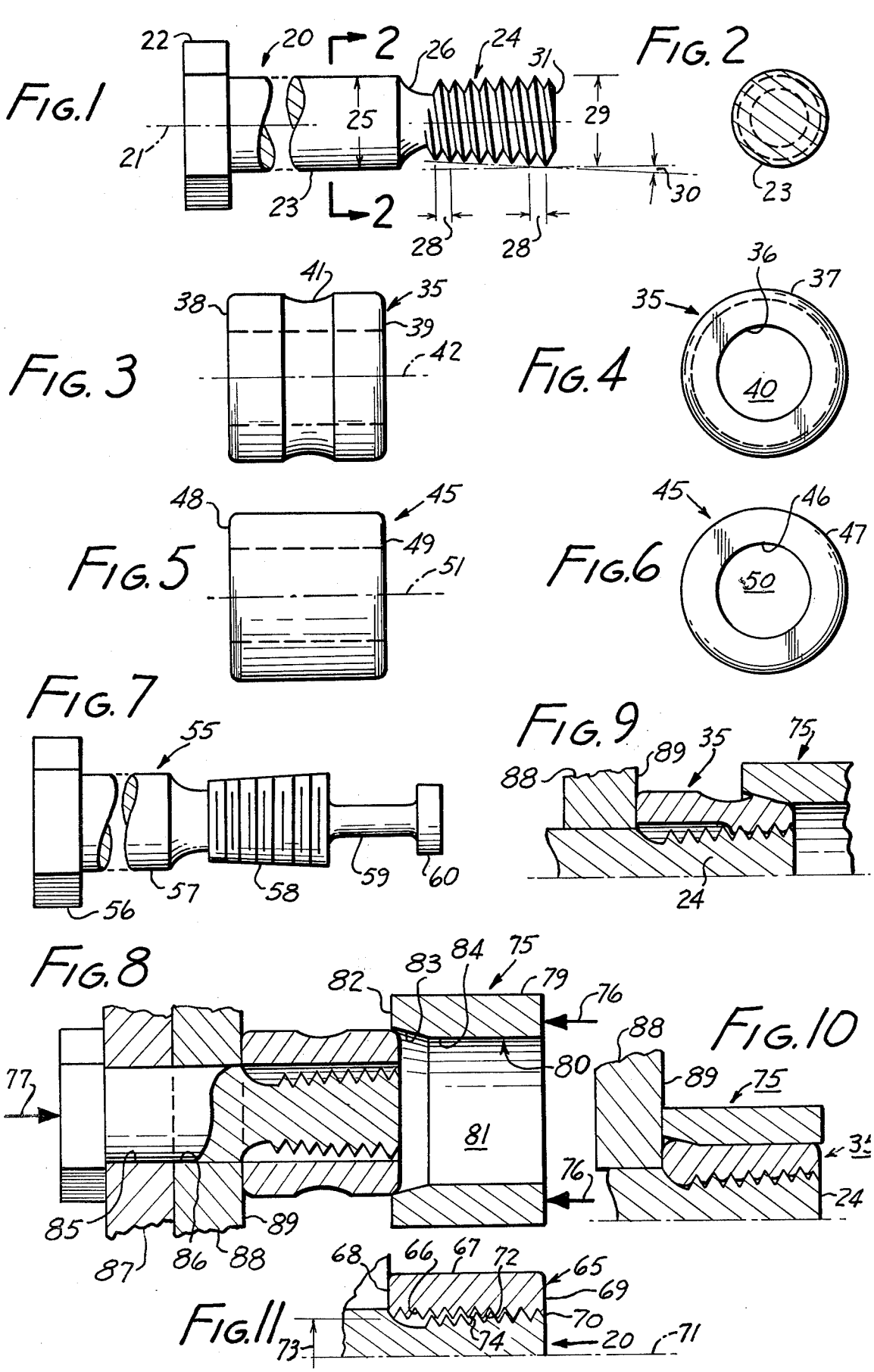

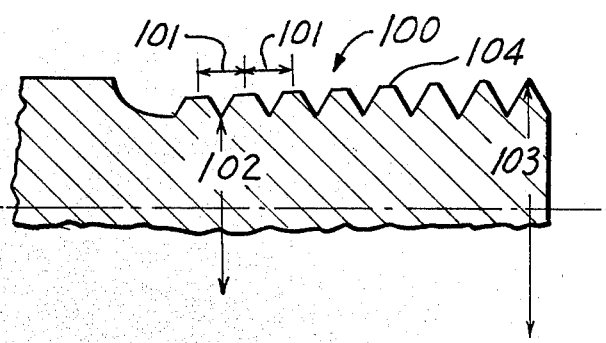
Fig.12
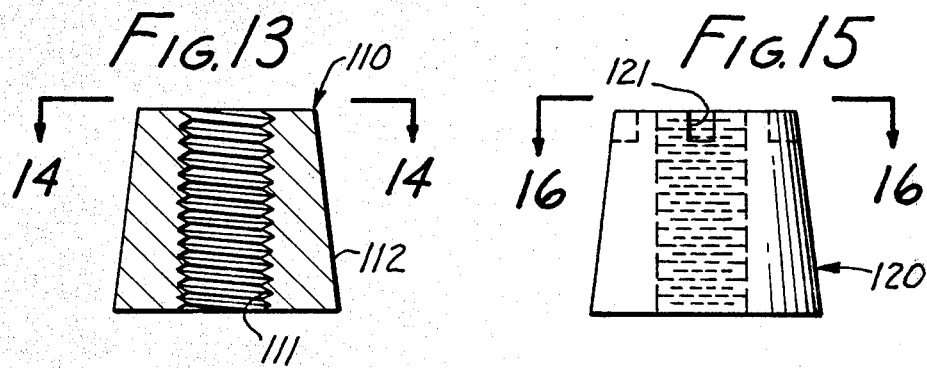
Fig.13  Fig.15
Fig.14  Fig.16
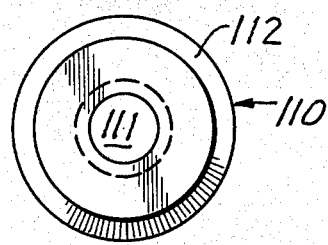
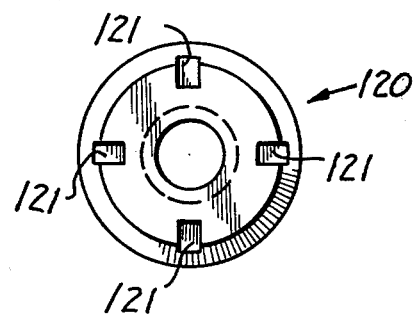
Fig.17  Fig.18
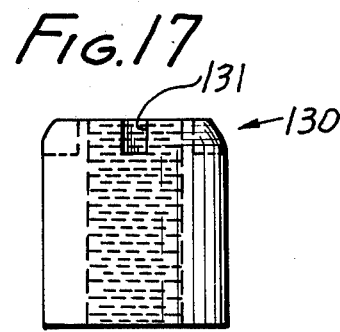
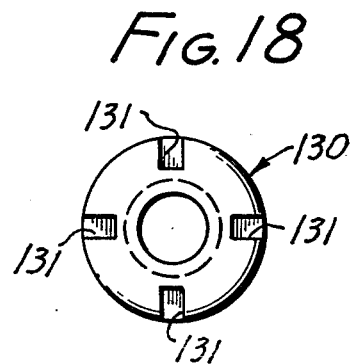

TWO-PIECE RIVET

This invention relates to a two-piece rivet comprising a shank member and a collar, which collar is swaged onto a thread carried by the shank member.

Two-piece rivets of this class are known. One known rivet is shown in Schuster U.S. Pat. No. 2,955,505 issued Oct. 11, 1960, wherein a collar is swaged onto an end of a shank member. This end has a plurality of ring-shaped ridges of diameters which decrease from a maximum at the tip end of the shank member. Another known type is shown in Ruhl U.S. Pat. No. 3,915,053, wherein a collar is swaged into a plurality of grooves of different axial lengths but identical diameters.

The Schuster patent exerts an axial force while being set which is similar to that exerted by the instant invention in that its collar also makes its first contact with the shank member near its tip end. As a consequence, a tensile force is generated in the shank member as the collar is progressively swaged onto the shank member and pressed against the workpiece. However, in the Schuster patent this is a step-wise function of engagement of ring after ring. This is a disadvantage in that generation of pre-load only occurs in the flow of the outer material of the collar which is being locked discontinuously in the grooves. It is an object of this invention to provide a helical thread wherein the engagement of the collar and the thread is a continuously progressive engagement so that the mechanical advantage of the inclined plane due to the helical angle will be utilized to uniformly pre-stress that portion of the fastener, as well as the entire assembly.

The Ruhl patent merely shows means for transferring loads at the base threads and is not concerned with creating a tensile force in the shank member.

Furthermore, both the Schuster and Ruhl patents use ring-shaped ridges which do not permit removal of the collar by exertion of sufficient torque. While this device is a locking fastener, the lock can be overcome by a sufficient torque, which permits readier removal and replacement.

A two-piece rivet according to this invention comprises a shank member having an axis, and a head, a shank and a thread in that order along the axis. The shank is cylindrical and has a shank diameter. The thread is helical and has a substantially constant pitch but has a major diameter which decreases as it extends from a maximum adjacent to its end farthest from the shank. A ring-like collar is to be swaged onto the thread. It has an inner wall, an outer wall, and a first end and a second end. The inner wall defines a passage between the ends to receive at least a portion of the thread, whereby with the shank placed in an aperture in a workpiece with at least a portion of the thread projecting beyond a surface of the workpiece, the collar may be placed over the thread. Then with the shank restrained to prevent its being thrust backward back into the aperture, a swaging setting force having both axial and radial components is exerted on the collar. This forces one end of the collar against the surface of the workpiece and swages the inner wall into the thread, starting at the maximum thread diameter, and continuously progressing along the thread.

According to a preferred but optional feature of the invention, a peripheral groove is formed in the outer wall of the collar which groove is axially spaced from both of the ends of the collar. Alternative preferred shapes of the collar for various materials may include a tapered exterior or a short taper at each end of the collar.

Other useful collar configurations include a tapered exterior, or a short taper at each end of the collar. The above and other features of this invention will be fully understood from the following detailed description and the accompanying drawings, in which:

FIG. 1 is a side view of the presently preferred embodiment of the invention;

FIG. 2 is a cross-section taken at line 2—2 in FIG. 1;

FIG. 3 is a side view of one embodiment of the collar for use with the shank member of FIG. 1;

FIG. 4 is a right hand end view of FIG. 3;

FIG. 5 is a side view of still another embodiment of collar;

FIG. 6 is a right hand end view of FIG. 5;

FIG. 7 shows the shank member of FIG. 1 provided with a pull-tail;

FIGS. 8, 9 and 10 are axial sections showing progressive stages in setting the rivet;

FIG. 11 shows another embodiment of the collar for use with the shank member of FIG. 1;

FIG. 12 is a fragmentary axial section showing another thread configuration according to the invention;

FIG. 13 is an axial section of another useful collar configuration;

FIG. 14 is a top view taken at line 14—14 in FIG. 13;

FIG. 15 is a side view of yet another useful collar configuration;

FIG. 16 is a top view taken at line 16—16 in FIG. 15;

FIG. 17 is a side view of still another useful collar configuration; and

FIG. 18 is a top view taken at line 18—18 in FIG. 17.

In FIG. 1 there is shown a shank member 20 having an axis 21, and a head 22, shank 23 and thread 24 in that order from the head. The shank is cylindrical and has a diameter 25. The head has greater radial dimensions than the shank.

The thread joins the shank section at a reduced portion 26 thereof. It is a helical thread, preferably having a sloping face 27 facing toward the head end although it may if desired be a square thread or other shape. It has a pitch dimension 28 which is constant for the full length of the thread. Its major diameter 29 changes by an amount on the order of approximately 0.025 inches per inch as shown by angle 30. The maximum major diameter is near to the end 31 farthest from the head.

The presently preferred embodiment of collar 35 for use with shank member 20 is shown in FIG. 3. This collar includes an inner wall 36, an outer wall 37, a first end 38 and a second end 39. Inner wall 36 forms a passage 40 which extends from end to end. A peripheral groove 41 extends around the collar in the outer wall spaced from the said two ends. The collar has an axis 42.

Another embodiment of collar 45 is shown in FIG. 5. It also includes an inner wall 46, an outer wall 47, first end 48 and second end 49. Inner wall 46 forms a passage 50 from end to end. The outer walls of both of the embodiments of FIG. 3 and 5 are cylindrical except for the groove 41 in FIG. 3. The ends are preferably square to axes 42 and 51 of the collars.

In FIG. 7 there is shown an alternate embodiment of shank member 55. It includes a head 56, a cylindrical shank 57 and a thread 58, all of which are identical to those of shank member 20. In addition it has a pull-tail 59 with a head 60 by means of which an axial pull can be exerted on the threaded end of the shank member as a convenience in setting. After the setting operation is completed the pull-tail can be clipped off, or will be pulled off in tension at the conclusion of the driving cycle, or otherwise removed.

FIG. 11 illustrates another embodiment of collar 65 which has an inner wall 66, outer wall 67, first end 68 and second end 69. Inner wall 66 forms passage 70 between the two ends. These are all concentric around axis 71. In contrast to the embodiments of FIGS. 3 and 5, a thread 72 is formed in the inner wall. The thread has a constant diameter 73 which engages but does not interfere with the maximum diameter of thread 24 as shown in FIG. 11. An increasing clearance 74 is formed between them along the axial dimension for purposes yet to be described.

FIG. 12 shows another thread shape 100 for use with this invention. It may be directly substituted for thread 24 in shank member 20. This thread also has a constant pitch 101, but instead of being formed as a uniform thread shape and an enlarging minor diameter, it is a conventional thread with uniform minor diameter 102 and uniform pitch, but with its crest ground off along a conical path to form a major diameter 103 which is at a maximum at the free end, and decreases as it extends toward the shank. This forms a flat 104 of increasing width as it extends toward the shank. The taper is about 0.025 inches per inch, as in FIG. 1.

FIG. 13 shows a collar 110 with an internally threaded passage 111 and a tapered conical outer wall 112. One effect of the taper is to provide additional material to be swaged into the decreasing-diameter thread. If preferred, the taper could extend part way from both ends so the collar would not be a one-way part.

FIG. 15 shows a collar 120 identical to collar 110, except for four wrench-engaging recesses 121. When the collar is to be unthreaded, it is convenient to have these recesses for the wrench to engage.

FIG. 17 shows still another useful collar 130 which is basically identical to collar 65 in FIG. 11. It could also have the external groove of the collar shown in FIG. 3. Its external wall is basically cylindrical, rather than tapered. The inside passage is threaded, and wrench-engaging surfaces 131 are formed for the wrench to engage if the collar is to be removed.

In general, a thread will be provided in the collar when relatively hard material such as steel is used to form the collar. The softer materials such as aluminum alloys, readily form thread shapes when they are swaged onto the thread of the shank member. Therefore, wrench-engaging surfaces may usefully be provided even when the passage is unthreaded. For example, in FIGS. 15 and 17 if the collar material readily flows to form threads and later unthreading is contemplated, then the wrench-engaging surfaces could be provided in these collars, but the passage would not be initially threaded.

The setting of these fasteners is illustrated in FIG. 8, together with a tool 72 for accomplishing it. Tool 75 is a swaging tool intended to exert an axial force as a consequence of being driven by a force indicated by arrows 76. An opposing force is indicated by arrow 77. Force 77 could be exerted by means such as a bucking bar or a clamp, or by pulling on a pull-tail. The tool may be percussively driven or may be pressed by a hydraulic tool, such as in opposition to a pull on the pull-tail. Setting techniques of these types are well-known and require no further description here.

The tool is formed as a tubular body 79. The tubular body has an internal wall 80 which defines a passage 81. It has a setting end 82 where the passage opens. The internal wall includes a deflection surface 83 in the form of a surface of revolution which decreases in diameter as it extends away from the setting end. The wall also preferably has a cylindrical portion 84 which "wipes" along the collar as it is formed.

As best shown in FIG. 8, the shank member 20 is inserted into aligned apertures 85, 86 in contiguous workpieces 87, 88 which are to be held together by this rivet. The head bears against one surface of one of the workpiece and the shank makes whatever class of fit is desired in the apertures. At least a portion of thread 24 projects beyond surface 89 of the workpiece.

The collar being used (in the illustrated case, collar 35) is placed over the threaded section. There is a relatively close fit or a very minor clearance between the inner wall and the maximum thread diameter. Now with the setting forces exerted, the material of the collar will be swaged inwardly to make contact with the thread, first at its maximum diameter.

As can be seen in FIG. 9 this swaging movement is a continuous situation as the tool moves along the outside of the outer wall. The grooves 41, when used, gives some relief when the tool passes over it to give room for some of the wave of material which preceeds the setting tool. As can be seen in FIG. 9, the wall material continuously and progressively enters the thread as the tool moves along.

In FIG. 10 the tool has moved completely to the surface 89 where it stops. In some installations, the tool might be stopped by a ring or protrusion of displaced collar metal itself. The inner wall material will preferably, but not necessarily, have engaged all convolutions of the thread, but it may or may not have filled them entirely, depending on the volumetric relationships which are used. What is important to this invention is that the engagement will have been a continuous and progressive one along the helical thread as contrasted with the effect in the Schuster patent of a step-wise function from ring-to-ring.

The foregoing collar arrangement is especially suitable for use with relatively soft collars when the collars of FIGS. 3 and 5 are made of an aluminum alloy, for example. If, however, it is desired to make the collar of stronger materials such as steel, then a collar such as collar 65 should be provided which is initially threaded and which makes a nearly net fit with the thread 24 at the maximum diameter. Now a suitably modified swaging tool can be moved along the outer wall and need only deflect the material the relatively small amount required to fill clearance 74, and the material will not have to flow as appreciably to form thread-like shapes to engage the thread on the shank member. This will reduce the setting forces required for a strong steel collar such as collar 65.

Once set, the collar is locked to the shank member. Because of the reverse nature of the thread, that is because the thread diameter enlarges as it extends away from the shank, the collar cannot be unthreaded without substantial deflection of material. It is, however, an advantage of this invention that the collar can be unthreaded, but this requires a very strong wrench such as an impact wrench, and significant difficulty will be encountered in the removal. Nevertheless it can be done, which is not the situation in the Schuster patent. One would not expect to reuse a fastener which had been disassembled in this manner. The wrench-engaging surfaces shown in FIGS. 15 and 17 assist the removal. Instead of recesses, these could be lugs or other shapes, but the illustrated recesses are very convenient to make, and work well.

Also of interest in this invention is the fact that while the rivet is being set, the swaging tool exerts a compressive force on the thread. However, this force also has an axial component 93 as a consequence in part of the reaction between the first end of the collar and surface 89 of the workpiece. Also, when a sloping face is provided on the thread, the component is emphasized. This reaction is known and described in Schuster U.S. Pat. No. 2,955,505. The primary distinction between the previous Schuster patent and this disclosure is that in the instant invention, the engagement is continuous and progressive along a helix instead of step-wise in a group of shoulders and this provides a mechanical advantage in pre-loading the fastener. Also, this device can with sufficient force be unthreaded by overcoming the locking feature.

The dimensions of this device may readily be selected by persons skilled in the art without undue experimentation. A relatively conventional thread size for the shank diameter should be provided, and the maximum diameter of the thread should be no greater than the cylindrical diameter of the shank in order that they may pass through the same hole in a workpiece. The materials of construction of the shank member may be any suitable rivet or bolt material, and the collar any suitable material to achieve the necessary deformation and deflection, and to have the strength required for the intended installation.

The engagement and retention of the collar to the thread of FIG. 12 is the same as that described above, except, of course, the thread has a different crest shape. Still, the collar is swaged to form an engagement which resists removal as the consequence of an enlarging major diameter.

All of the illustrated collars can be used interchangeably on the shank members of FIGS. 1 and 12.

In this specificaton, the internal thread in the collar shown in FIG. 11 is regarded as part of the inner wall.

The term "substantial radial clearance" as used herein to describe the radial relationship between the the inner wall of the collar and at least a portion of the thread is intended to distinguish from a typical threaded engagement of a nut and bolt. A clearance between the collar and a portion of the thread spaced from the end of the shank member farthest from the shank is needed so that a larger diameter portion closer to that end can make first engagement with the collar.

The invention is not to be limited by the embodiments shown in the drawings and described in the description which are given by way of example and not of limitation, but only in accordance with the scope of the appended claims.

I claim:

1. A two-piece rivet comprising: a shank member having an axis, and a head, a shank, and a thread in that order along the axis, said shank being cylindrical and having a shank, said thread being helical and having a substantially constant pitch, but having a major diameter which decreases as it extends away from a maximum adjacent to its end farthest from the shank, said maximum diameter being no greater than said shank diameter; and a ring-like collar to be swaged onto said thread, said collar having an inner wall and an outer wall, and a first and a second end, said inner wall defining a passage between said ends to receive with a substantial radial clearance at least a portion of said thread spaced from the end farthest from the shank, and with a larger diameter portion of the thread closer to said end and also received in said passage, whereby with said shank placed in an aperture in a workpiece, with at least a portion of the thread projecting beyond a surface of said workpiece, the collar may be placed over the thread, and with the shank restrained to prevent its being thrust back into the aperture, a swaging setting force having both axial and radial components can be exerted on the outer wall of the collar near its end farthest from the shank, whereby to force the other end of the collar against said surface of the workpiece, and to swage said inner wall adjacent to said first-mentioned end into the thread at its maximum diameter, and thereafter continuously moving said swaging force axially along the outer wall toward said surface to progressively and continuously swage the inner wall into engagement with the thread and maintain the axial force component against the workpiece thereby to exert through the thread a force on the shank member having an axial component directed away from said head.

2. A two-piece rivet according to claim 1 in which the said inner wall is cylindrical.

3. A two-piece rivet according to claim 2 in which said collar is made of an aluminum alloy.

4. A two-piece rivet according to claim 1 in which said inner wall bears a thread having a constant pitch, and an internal crest which engages but does not interfere with the maximum diameter of the thread on the shank member.

5. A two-piece rivet according to claim 4 in which said collar is made of steel.

6. A two-piece rivet according to claim 1 in which a peripheral groove is formed in said outer wall axially spaced from both of said ends of the collar.

7. A two-piece rivet according to claim 1 in which a pull-tail is integrally formed on the shank member at the thread end, whereby an axial pull can be exerted on the shank member while the said setting force is exerted on the collar.

8. A two-piece rivet according to claim 1 in which said outer wall is axially tapered, having a larger and a smaller end.

9. A two-piece rivet according to claim 8 in which said taper is constant from end to end of the collar.

10. A two-piece rivet according to claim 1 in which said outer wall is axially tapered from both ends.

11. A two-piece rivet according to claim 1 in which the collar is provided with wrench-engaging means whereby a wrench may engage and turn the collar when the set rivet is to be disassembled.

12. A two-piece rivet according to claim 1 in which said thread has a pitch diameter, which decreases from a maximum near the end of the shank member farthest removed from the head.

13. A two-piece rivet according to claim 1 in which said thread has a pitch diameter which is constant.

14. A two-piece rivet according to claim 13 in which a spiral flat crest surface is formed on the thread, which increases in width as it extends away from said farthest end.

* * * * *